United States Patent
Datta

(10) Patent No.: US 11,294,855 B2
(45) Date of Patent: *Apr. 5, 2022

(54) CLOUD-AWARE SNAPSHOT DIFFERENCE DETERMINATION

(71) Applicant: EMC IP HOLDING COMPANY LLC, Hopkinton, MA (US)

(72) Inventor: Pankaj Datta, Acton, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 353 days.

This patent is subject to a terminal disclaimer.

(21) Appl. No.: 16/376,307

(22) Filed: Apr. 5, 2019

(65) Prior Publication Data

US 2019/0236051 A1 Aug. 1, 2019

Related U.S. Application Data

(63) Continuation of application No. 14/981,695, filed on Dec. 28, 2015, now Pat. No. 10,296,594.

(51) Int. Cl.
*G06F 16/11* (2019.01)
*G06F 16/172* (2019.01)
*G06F 16/182* (2019.01)
*G06F 16/23* (2019.01)

(52) U.S. Cl.
CPC .......... *G06F 16/128* (2019.01); *G06F 16/172* (2019.01); *G06F 16/1824* (2019.01); *G06F 16/2365* (2019.01)

(58) Field of Classification Search
None
See application file for complete search history.

(56) References Cited

U.S. PATENT DOCUMENTS

| | | | |
|---|---|---|---|
| 8,484,163 B1 | 7/2013 | Yucel et al. | |
| 9,043,567 B1 | 5/2015 | Modukuri et al. | |
| 2005/0021566 A1 | 1/2005 | Mu | |
| 2006/0218135 A1 | 9/2006 | Bisson et al. | |
| 2007/0019520 A1 | 1/2007 | Isozaki et al. | |
| 2008/0306986 A1 | 12/2008 | Doyle | |
| 2009/0249005 A1 | 10/2009 | Bender et al. | |
| 2009/0300079 A1 | 12/2009 | Shitomi | |
| 2010/0274772 A1 | 10/2010 | Samuels | |
| 2010/0332454 A1 | 12/2010 | Prahlad et al. | |

(Continued)

OTHER PUBLICATIONS

Final Office Action received for U.S. Appl. No. 14/986,309 dated Sep. 5, 2019, 49 pages.

(Continued)

*Primary Examiner* — Aleksandr Kerzhner
*Assistant Examiner* — Eddy Cheung
(74) *Attorney, Agent, or Firm* — Amin, Turocy & Watson, LLP

(57) ABSTRACT

Modifications made to files (e.g., stub files) within a distributed file storage system over a defined time period are determined. Moreover, the distributed file storage system employs a tiered cloud storage architecture. In one aspect, snapshots of a stub file can be generated at different instances of time. Further, metadata of the stub file within the different snapshots can be compared to determine whether the stub file has been modified. As an example, the metadata can include cache metadata that describes the content within the cache of the stub file and/or mapping metadata that describes the content within cloud storage that is referenced by the stub file.

20 Claims, 10 Drawing Sheets

(56) References Cited

U.S. PATENT DOCUMENTS

| | | |
|---|---|---|
| 2011/0264870 A1 | 10/2011 | Ylonen |
| 2013/0110790 A1 | 5/2013 | Matsumoto et al. |
| 2013/0238554 A1 | 9/2013 | Yucel et al. |
| 2013/0311551 A1 | 11/2013 | Thibeault |
| 2014/0006858 A1 | 1/2014 | Helfman et al. |
| 2014/0046900 A1 | 2/2014 | Kumarasamy et al. |
| 2014/0149476 A1 | 5/2014 | Kishimoto et al. |
| 2014/0181443 A1 | 6/2014 | Kottomtharayil et al. |
| 2014/0201141 A1 | 7/2014 | Vibhor et al. |
| 2014/0201144 A1 | 7/2014 | Vibhot et al. |
| 2014/0337285 A1 | 11/2014 | Gokhale et al. |
| 2014/0358856 A1 | 12/2014 | Shitomi |
| 2015/0212896 A1 | 7/2015 | Pawar et al. |
| 2015/0243984 A1 | 8/2015 | Kase et al. |
| 2015/0372938 A1 | 12/2015 | Patel et al. |
| 2015/0379107 A1 | 12/2015 | Rank et al. |
| 2016/0004720 A1 | 1/2016 | Tabaaloute et al. |
| 2016/0139836 A1 | 5/2016 | Nallathambi et al. |

OTHER PUBLICATIONS

Non-Final Office Action received for U.S. Appl. No. 14/986,309 dated May 4, 2020, 50 pages.
Final Office Action received for U.S. Appl. No. 14/986,309 dated Nov. 13, 2020, 48 pages.
Office Action for U.S. Appl. No. 14/986,309 dated Jan. 11, 2018, 49 pages.
Office Action for U.S. Appl. No. 14/986,309 dated May 4, 2018, 44 pages.
Office Action for U.S. Appl. No. 14/986,309 dated Feb. 25, 2019, 49 pages.
Office Action for U.S. Appl. No. 14/981,695 dated Jun. 29, 2018, 41 pages.

CLOUD-AWARE SNAPSHOT DIFFERENCE DETERMINATION

RELATED APPLICATION

The subject patent application is a continuation of, and claims priority to, U.S. patent application Ser. No. 14/981,695, filed Dec. 28, 2015, and entitled "CLOUD-AWARE SNAPSHOT DIFFERENCE DETERMINATION," the entirety of which application is hereby incorporated by reference herein.

TECHNICAL FIELD

The subject disclosure relates generally to systems and methods for cloud-aware snapshot difference determination.

BACKGROUND

As cloud storage begins to proliferate, a large growth in utilization of cloud storage by cloud storage providers, organizations, and individuals alike with data storage needs both large and small has been observed. An organization that maintains a privately owned data center(s) that hosts data of the organization can tier some of their data to a public cloud while still maintaining a set of data in their private data center, for example, to reduce storage-related costs. Typically, a stub (e.g., remnant) of a file can be stored in the private data center after its data content is moved to the public cloud. The stub can comprise metadata necessary to manage the stub file and associated data objects, and/or mapping information that provides a location of the cloud data objects that contain the original file content. In addition, the stub can contain locally cached data obtained from the public cloud. Determining which files have changed over time (e.g., across snapshots) allows customers to selectively and thus, efficiently retrieve only such files from Network-Attached Storage (NAS) storage for further processing Oftentimes, the metadata, mapping information, and/or cached data can change even though the data content has not been modified. Conventional systems do not account for these changes when comparing a stub file to a regular file or two stub files leading to errors in determination of content modification.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

The systems and methods disclosed herein relate to determining whether modifications have been made to a cloud-backed file over time. In one aspect, a system comprises a processor and a memory that stores executable instructions that, when executed by the processor, facilitate performance of operations. Moreover, the operations comprise determining snapshot data comprising snapshots of a file at different instances in time, wherein at least at one of the different instances in time the file is represented as a stub file that references content stored in a network storage device and comprises a region employable to store a portion of the content in response to receiving a request for the portion of the content, and wherein the stub file comprises metadata associated with the content. The operations further comprise determining a change in the content over the different instances in time based on an analysis of the metadata.

One embodiment of the specification relates to a method that comprises receiving, by a system comprising a processor, snapshot data comprising snapshots of a file at different instances in time, wherein at least at one of the different instances in time the file is represented as a stub file that references content stored in a network storage device and comprises a region employable to store a portion of the content in response to receiving a request for the portion of the content, and wherein the stub file comprises metadata associated with the content. The method further comprises determining a difference between the snapshots based on analyzing the metadata.

Another embodiment of the specification relates to a computer-readable storage medium comprising instructions that, in response to execution, cause a device comprising a processor to perform operations, comprising determining first snapshot data comprising a first snapshot of a file associated with content at a first instance in time and determining second snapshot data comprising a second snapshot of the file at a second instance in time. At least at the first instance in time or the second instance in time, the file is represented as a stub file that stores pointer data that references the content that is stored in a network storage device and that comprises a region employable to store a portion of the content in response to receiving a request for the portion of the content, and wherein the stub file comprises metadata associated with the content. Further, the operations comprise analyzing the metadata to facilitate a comparison of the first snapshot with the second snapshot.

The following description and the drawings set forth certain illustrative aspects of the specification. These aspects are indicative, however, of but a few of the various ways in which the principles of the specification may be employed. Other advantages and novel features of the specification will become apparent from the detailed description of the specification when considered in conjunction with the drawings.

DETAILED DESCRIPTION

Figure 1:
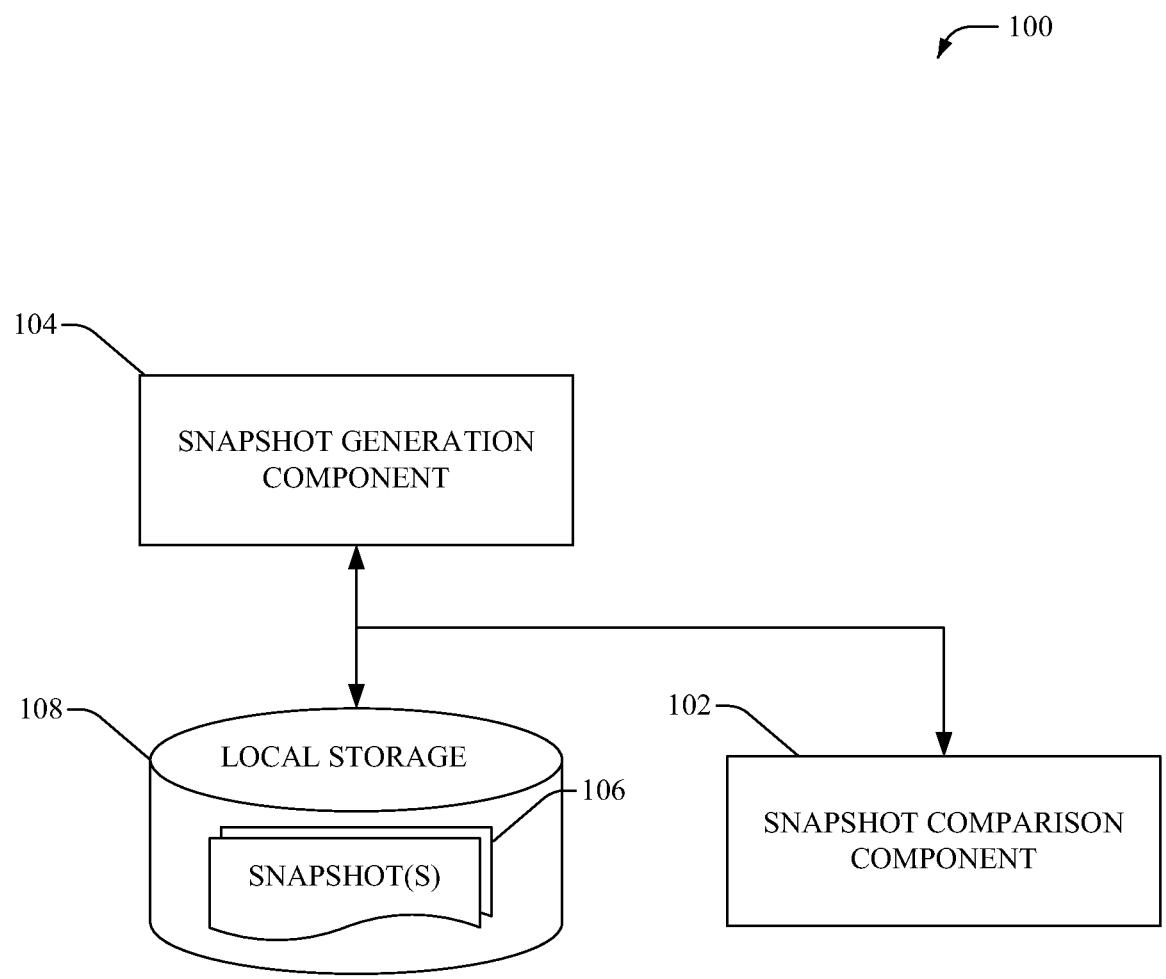
FIG. 1 illustrates an example system that facilitates a determination of a difference between snapshots of a cloud-backed file within a distributed file storage system.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

The term "cloudpool" as used herein refers to a pool of cloud storage accounts in which data can be tiered to from a private storage infrastructure. It can also refer to a cloud storage provider instance, for example, a Microsoft Azure storage subscription, a Amazon S3 account, an EMC Elastic Cloud Storage (ECS) account, and/or an EMC Isilon RAN namespace access point. A single cloudpool can contain accounts from multiple cloud providers and/or multiple accounts from a single cloud provider.

The terms "primary storage," "local storage," and/or "private storage" refer to a data storage system that is the primary access point for stored data. In most implementations, primary storage is private infrastructure operated on the premises of the data storage client. In one implementation, the primary storage can be an EMC Isilon Cluster.

The term "stub," "stub file," "smartlink," and/or "smartlink file" are used interchangeably herein and refer to the remnant of a file in local storage after its data content is moved to cloud storage. The stub can contain original system metadata, user metadata, additional metadata necessary to manage the stub file and associated data objects, and/or mapping information that provides a location of the cloud data objects that contain the original file content. In some implementations, the stub can contain locally cached data obtained from the cloud. It can be appreciated that until all the content of the file is fully reconstituted from cloud storage, the file can remain a stub. The stub file can contain information about the tiered data's compression state and/or encryption state. In one implementation, the stub file can contain mappings to one cloud object containing the metadata (e.g., Cloud Metadata Object as defined below). The term "local file" as used herein refers to a regular non-stubbed file.

The term "local data cache," or "local cache," or "locally cached data" refers to data obtained from cloud storage and stored in local storage that is associated with a stubbed file. A local data cache can be a specific area of storage space within a clustered file system and is not limited to a specific type of storage device such as solid-state storage, flash storage or magnetic storage. The modified cache content is periodically written back to cloud storage (as cloud objects, see below) and the cache "emptied" thereafter to conserve space on the primary storage.

The term "Cloud Metadata Object" or "CMO" refers to the cloud object containing metadata information relating to tiered data. The CMO can contain reverse links to the original file in local storage, the same mapping information that is stored in the stub file, pertinent policy information related to the file such as retention period, encryption information, compression information, and original file system metadata information. In one implementation, the CMO can also itself be encrypted and/or compressed. One example CMO data structure includes an encrypted file path, a compression flag, the local storage logical inode (LIN) of the stub (e.g., includes in-memory representation of on-disk data structures that may store information, or metadata, about files and directories, such as file size, file ownership, access mode (read, write, execute permissions), time and date of creation and modification, file types, data protection process information, snapshot information, hash values associated with location of the file, a flag indicating the LIN is associated with a stub file, mappings to cloud data objects, pointers to a cloud metadata objects, etc.), the local file path, statistical information on the file, a checksum, mapping information (e.g., includes cloud storage account, object identifier, snapshot identifier, index number, length/size of the object, etc.).

The term "Cloud Data Object" or "CDO" refers to the cloud object containing the actual tiered content data. A cloud data object is generally limited to a chunk size as described below. Depending on the size of the file being tiered to the cloud, and the size of the chunk, in many examples, there can be multiple CDOs representing an individual file. CDOs can be associated with a unique object identifier, a cloud account identifier, and can be associated with sub chunks.

Further, the term "cloud" as used herein can refer to a set of network servers, communicatively and/or operatively coupled to each other, that host a set of applications utilized for servicing user requests. In general, the cloud computing resources can communicate with user devices via most any wired and/or wireless communication network to provide access to services that are based in the cloud and not stored locally (e.g., on the user device). A typical cloud-computing environment can include multiple layers, aggregated together, that interact with each other to provide resources for end-users.

The systems and methods disclosed herein relate to determining whether modifications have been made to a smartlink file. In one aspect, the smartlink file comprises a pointer to content in cloud storage and can at least temporarily be data bearing (e.g., store a cached version of at least a portion of the content). Further, the smartlink file can be versioned, for example, in accordance with control structures employed by the smartlink file. According to an aspect, changes in metadata associated with the smartlink file can be analyzed to determine the modifications that have been made to the smartlink file over an interval of time.

Referring initially to FIG. 1, there illustrated is an example system 100 that facilitates a determination of a difference between snapshots of a cloud-backed file within a distributed file storage system, according to one or more aspects of the disclosed subject matter. Typically, the file can include a stub file, wherein the stub references content data stored in cloud storage (e.g., public cloud). When a client, for example, Network File System (NFS) client, requests access to the content data, a portion of the content data that has been requested is retrieved and cached as part of the stub. The client can then read and/or write to the cached data. Modifications, if made to the cached data, are periodically (and/or at specified times) synchronized with the cloud storage.

At different instances in time, the stub can have different portions of the content data within the cache, for example, based on different requests received from the client. In one example scenario, during a first time period, the cache can be empty and during a second time period, the cache can be populated with the content data (or a portion thereof). Thus, in these example scenarios, even though the content data has not changed, a simple comparison of the stub at the different times can incorrectly indicate a change in the file. To avoid such errors, system 100 employs a snapshot comparison component 102 that analyzes metadata associated with the content data to accurately identify whether the content data has changed over time. Further, the snapshot comparison component 102 can determine a section (e.g., block from offset A to offset B, wherein A and B are positive integers) of the content data that has been modified.

In one aspect, a snapshot generation component 104 can create snapshots 106 of files (e.g., stub files) stored within a cluster of nodes (referred herein as clusters) at different instances of time. As an example, the snapshot generation component 104 can create the snapshots periodically, at specified times, on request, in response to an event, etc. The term "snapshot" as used herein refers in general to a state of a file at a particular point in time. Typically, a "snapshot" can comprise a read-only static view/copy of a file at the particular point in time. In one aspect, the snapshot generation component 104 can generate and store the read-only static view/copy of the file (e.g., stub file) within local storage 108. As an example, the snapshot 106 of a stub file includes cached data (if any) and metadata relating to the cache and/or relating to the content (e.g., within cloud storage) that is referenced by the stub file. In one implementation, the snapshot 106 can be stored within a sparse file, for example, a file that does not contain user data and/or has not been allocated disk space for user data. It is noted that subsequent updates made to a file do not affect the contents of the snapshot 106. In general, snapshots 106 can be utilized for various applications, such as, but not limited to, backup/restore during a failure of the cluster, synchronization with another cluster, report generation, safeguarding data against errors, etc.

According to an embodiment, the snapshot comparison component 102 can determine whether a modification has been made to a file, for example, a stub file, based on a comparison of metadata within snapshots 106 of the file that have been created at different instances of time. Typically, the metadata can include data structures, such as, but not limited to, data structures that are employed to interpret on-cloud and/or on-disk data. In one aspect, a cacheinfo data structure can provide a description of the cached data (on-disk data) of the stub. For example, cacheinfo data structure can indicate whether the stub file contains cached data or if the cache of the stub file is empty e.g., "uncached." Further, when the stub file contains cached data, the cacheinfo data structure can indicate whether the cached data has been "read" or has been "modified." As an example, if the modifications to the cached data are written back to the cloud (e.g., synchronized with the cloud content referenced by the stub), the cached data may no longer be marked as "modified." In another aspect, a mapinfo data structure can provide a description of the map entries written to the cloud storage (on-cloud data). Moreover, the mapinfo data structure can provide location information (e.g., offsets, lengths, etc.) associated with the content stored within the cloud storage. For example, the mapinfo data structure can specify that offset X, length Y, of content (e.g., wherein X and/or Y are positive integers) is available on the cloud storage at a specified location of a specified object.

In one example scenario, during a first time, when a client is not accessing a stub file, the cache of the stub file can be empty. When a client requests access to the stub file, at least a portion of the content data requested by the client is retrieved from the cloud storage and stored in the cache. The client can then work on the cached data and can read or write to the data. If the client simply reads the cached data, the cache info data structure can be updated during a second time to indicate that the cached data has been read; alternatively, if the client writes to and modifies the cached data, the cache info data structure can be updated during a second time to indicate that the cached data has been written to. After the modifications made by the client are updated in the cloud content, the map entries in the mapinfo data structure are updated. In this example scenario, the snapshot comparison component 102 can determine that the cacheinfo data structure in a first snapshot (e.g., generated by the snapshot generation component 104 at a first instance of time) of a stub file indicates that the stub file was uncached and the cacheinfo data structure in a second snapshot (e.g., generated by the snapshot generation component 104 at a second instance of time) of the stub file indicates that the cache of the stub file contains at least a portion of the cloud stored content. Further, if the snapshot comparison component 102 determines, based on the cacheinfo data structure in the second snapshot, that the cached data has only been read and, based on a comparison of mapinfo data structures of the first and second snapshots, that the map entries of the stub file have not changed, then the snapshot comparison component 102 can determine that the stub file has not been modified. Alternatively, if the snapshot comparison component 102 determines, based on the cacheinfo data structure in the second snapshot, that the cached data has been written to and, based on a comparison of mapinfo data structures of the first and second snapshots, that the map entries of the stub file have not changed, then the snapshot comparison component 102 can determine that the stub file has been modified. Further, if the snapshot comparison component 102 determines, based on the cacheinfo data structure in the second snapshot, that the cached data has been written to and, based on a comparison of mapinfo data structures of the first and second snapshots, that the map entries of the stub file have changed, then the snapshot comparison component 102 can determine that the stub file has not been modified (e.g., since changes have been updated to the cloud storage).

In another example scenario, after a first snapshot has been taken (e.g., by the snapshot generation component 104), a client can request for access to the stub file, modify the cached content, and the modifications can be updated within the cloud. At this stage, the mapinfo data structure can be updated to indicate that the modification have been updated within the cloud. After the update, the client (or another client) can request for access to the stub file again (e.g., to access different or same portions of the content) and this time can only read the cached data. At this stage, the cacheinfo data structure can be updated to indicate that the currently cached data has only been read. If a second snapshot is taken (e.g., by the snapshot generation component 104) after the cached data has been read, the cacheinfo data structure can indicate that the content in the cache has only been read. In this example scenario, if the snapshot comparison component 102 determines that the cacheinfo data structure in the second snapshot indicates that the cached data of the stub file has been read and further determines, based on a comparison of mapinfo data structures of the first and second snapshots, that the map entries of the stub file have changed, then the snapshot comparison component 102 can determine that the stub file has been modified. Further, if after the update or after the read, the cache is emptied, the cacheinfo data structure can be updated to indicate that the stub file is uncached. If the second snapshot is taken (e.g., by the snapshot generation component 104) after the cache has been emptied, the snapshot comparison component 102 can determine that the cacheinfo data structure in the second snapshot indicates that the stub file is uncached and can further determine, based on a comparison of mapinfo data structures of the first and second snapshots, that the map entries of the stub file have changed. In this example scenario, the snapshot comparison component 102 can determine that the stub file has been modified.

In some cases, a stub file can be converted to a local file over time (or vice versa) and/or the stub file can be stored as a local file on a different cluster. In this example scenario, the snapshot comparison component 102 can compare the local file with a stub file version of the local file. Moreover, the snapshot comparison component 102 can determine whether the file has changed based on an analysis of the metadata (e.g., cacheinfo and/or mapinfo data structures) of the stub file.

Further, the snapshot comparison component 102 can be utilized to determine sparse regions (e.g., regions of a file that do not contain user data). In one aspect, the stub file metadata can include sparseness data associated with the sparse regions. In one example, the snapshot comparison component 102 can compare a snapshot of the file (e.g., generated by the snapshot generation component 104) with an invalid snap and based on an analysis of the metadata, can identify the sparse regions (e.g., offsets between which user data is not stored).

It is noted that the local storage 108 can include volatile memory(s) or nonvolatile memory(s), or can include both volatile and nonvolatile memory(s). Examples of suitable types of volatile and non-volatile memory are described below with reference to FIG. 10. The memory (e.g., data stores, databases) of the subject systems and methods is intended to comprise, without being limited to, these and any other suitable types of memory.

Figure 2:
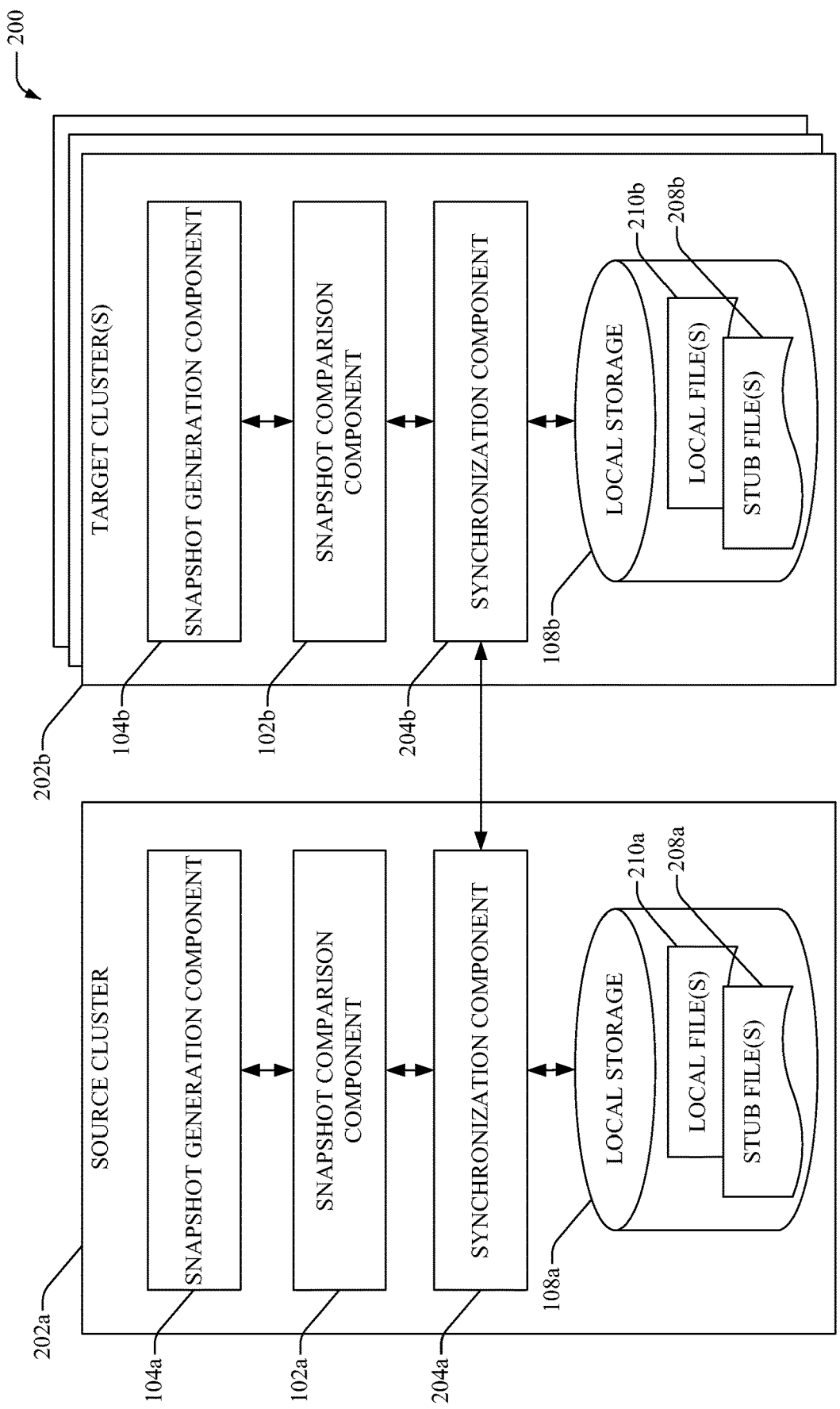
FIG. 2 illustrates an example system for determining updates to files during a synchronization between clusters.

Referring now to FIG. 2, there illustrated is an example system 200 for determining updates to files during a synchronization between clusters, in accordance with an aspect of the subject disclosure. It is noted that the snapshot comparison components 102a and 102b can be substantially similar to snapshot comparison component 102 and can include functionality as more fully described herein, for example, as described above with regard to snapshot comparison component 102. Further, it is noted that the snapshot generation components 104a and 104b can be substantially similar to snapshot generation component 104 and can include functionality as more fully described herein, for example, as described above with regard to snapshot generation component 104. Furthermore, it is noted that the local storage 108a and 108b can be substantially similar to local storage 108 and can include functionality as more fully described herein, for example, as described above with regard to local storage 108.

In one aspect, system 200 can include a source cluster 202a and one or more target cluster(s) 202b that are employed to provide redundancy during failure events, such as, but not limited to a failover, a switchover, etc. In one example, data files associated with (e.g., retained within and/or referenced via) the source cluster 202a can be replicated to the target cluster(s) 202b, such that upon the occurrence of the failure event, clients can be actively migrated (e.g., during ongoing file system activity) from the source cluster 202a to the target cluster(s) 202b. A set of clients, for example, NFS clients, can connect to source cluster 202a via a network interface and subsequent to the failure event, the clients can be connected to the target cluster(s) 202b and provided access to mirrored copies of the data, stored on the target cluster(s) 202b, that the clients were expecting to access via the original source cluster 202a.

It is noted that above example relates to a cluster wide failure, such that the entire source cluster of nodes 202a experiences a failure, or some other triggering event occurs, providing for clients to failover to a separate cluster of nodes (e.g., target cluster 202b) running a separate instance of the base operating system. This is different from a node failure, wherein, clients among a cluster of nodes can failover to a different node among the same cluster.

During an initial synchronization, all the data stored within local storage 108a (or referenced by the stub files 208a and stored within cloud storage) can be copied to local storage 108b; however, during each subsequent synchronization, only modifications and/or changes to the data can be copied (e.g., to conserve computing and/or transmission resources). In one aspect, during the subsequent synchronizations the snapshot comparison component 102a can determine changes that have been made to the file data (e.g., stub files 208a and/or local files 210a) within local storage 108a, for example, based on a comparison of snapshots of the local storage 108a taken during or subsequent to the initial (or previous) synchronization and taken at a current time (prior to the subsequent synchronization), for example, by the snapshot generation component 104a.

During a failure event (e.g., failover) associated with a failure of the source cluster 202a, clients can be routed to the target cluster 202b and can be provided access to file data retained within local storage 108b and/or file data retained within cloud storage referenced via stub files 208b. In one example scenario, the clients can update and/or modify data within the local storage 108b. Further, the clients can delete one or more of the stub files 208b and/or local files 210b and/or create new stub files 208b and/or local files 210b. In addition, one or more stub files 208b can be converted to local files 210a and/or vice versa. When the failure event is resolved (e.g., source cluster is healthy and/or active), the synchronization component 204b can transfer a copy of these updates and/or modifications to the local storage 108a via synchronization component 204a. As an example, the snapshot generation component 104b can generate a first snapshot of the local storage 108b during (or subsequent) to the failure event. Further, snapshot generation component 104b can generate a second snapshot of local storage 108b when determined that the failure event has been resolved (e.g., prior to a failback). The snapshot comparison component 102b can be utilized to determine whether any modifications have been made to the files stored in the local storage 108b. Moreover, if determined that modifications have been made, the modified data is identified (e.g., by the snapshot comparison component 102b) and a copy of the modified data is transferred by the synchronization component 204b to the synchronization component 204a, which in turn can update the stub files 208a and/or local files 210a based on the modified data.

Figure 3:
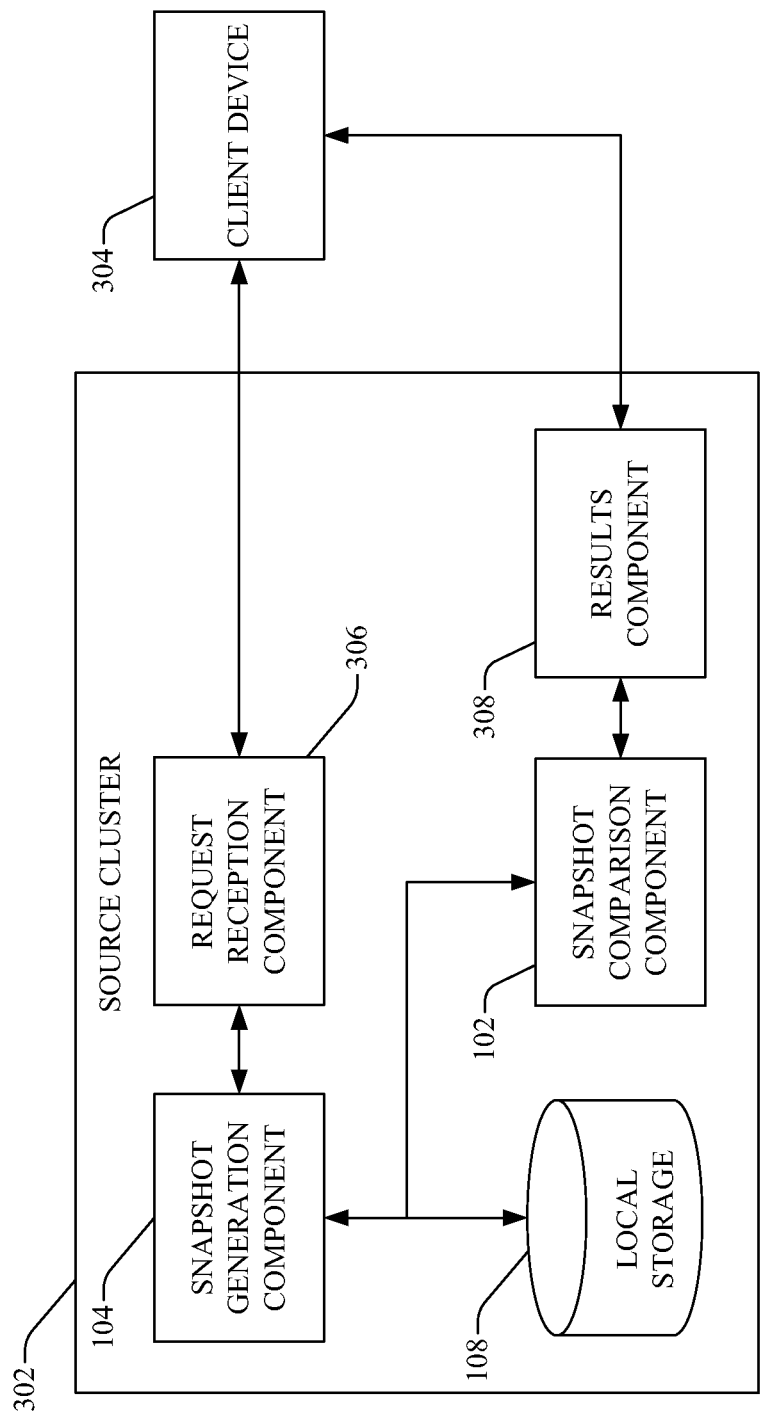
FIG. 3 illustrates an example system that facilitates an on-demand determination of updates to stub files.

Referring now to FIG. 3, there illustrated is an example system 300 that facilitates an on-demand determination of updates to stub files, according to an aspect of the subject disclosure. It is noted that the source cluster 302 can be substantially similar to the source cluster 202a and can include functionality as more fully described herein, for example, as described above with regard to source cluster 202a. Further, it is noted that the snapshot comparison component 102, the snapshot generation component 104, and the local storage 108 can include functionality as more fully described herein, for example, as described above with regard to 100.

In one aspect, a client device 304 can transmit a request for determining updates made during a specific time period. As an example, the client device 304 can include most any electronic communication device such as, but not limited to, most any consumer electronic device, for example, a tablet computer, a digital media player, a digital camera, a cellular phone, a personal computer, a personal digital assistant (PDA), a smart phone, a laptop, a wearable device, a gaming system, etc. Furthermore, the client device 304 can include a machine-to-machine (M2M) device such as, but not limited to, most any network-connected appliance, machine, and/or device. In one implementation, the request can include parameters, such as, but not limited to, the time period and/or a selection of specific files etc. A request reception component 306 can receive the request and can instruct the snapshot generation component 104 to generate snapshots of the specified files, for example, stub files within the local storage 108, at the beginning and termination of the time period.

The snapshot comparison component 102 can compare the snapshots to determine whether any modifications were made to the files during the time period. In one aspect, the snapshot comparison component 102 can analyze metadata associated with a stub file in the snapshots to identify whether the stub file has been modified. If determined that the stub file has been modified, the snapshot comparison component 102 can identify regions of the file that were modified. A results component 308 can aggregate the comparison results of the stub files and provide the aggregated data to the client device 304 for further processing. As an example, the aggregated data can be presented via a display of the client device 304 and/or utilized by an application of the client device 304, for example, to perform analytics and/or application-specific analysis. In one implementation, the client device 304 can communicate with the source cluster 302 (e.g., with request reception component 306 and/or results component 308) by employing an NFS protocol.

FIGS. 4-8 illustrate flow diagrams and/or methods in accordance with the disclosed subject matter. For simplicity of explanation, the flow diagrams and/or methods are depicted and described as a series of acts. It is to be understood and appreciated that the various embodiments are not limited by the acts illustrated and/or by the order of acts, for example acts can occur in various orders and/or concurrently, and with other acts not presented and described herein. Furthermore, not all illustrated acts may be required to implement the flow diagrams and/or methods in accordance with the disclosed subject matter. In addition, those skilled in the art will understand and appreciate that the methods could alternatively be represented as a series of interrelated states via a state diagram or events. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/communications media.

Figure 4:
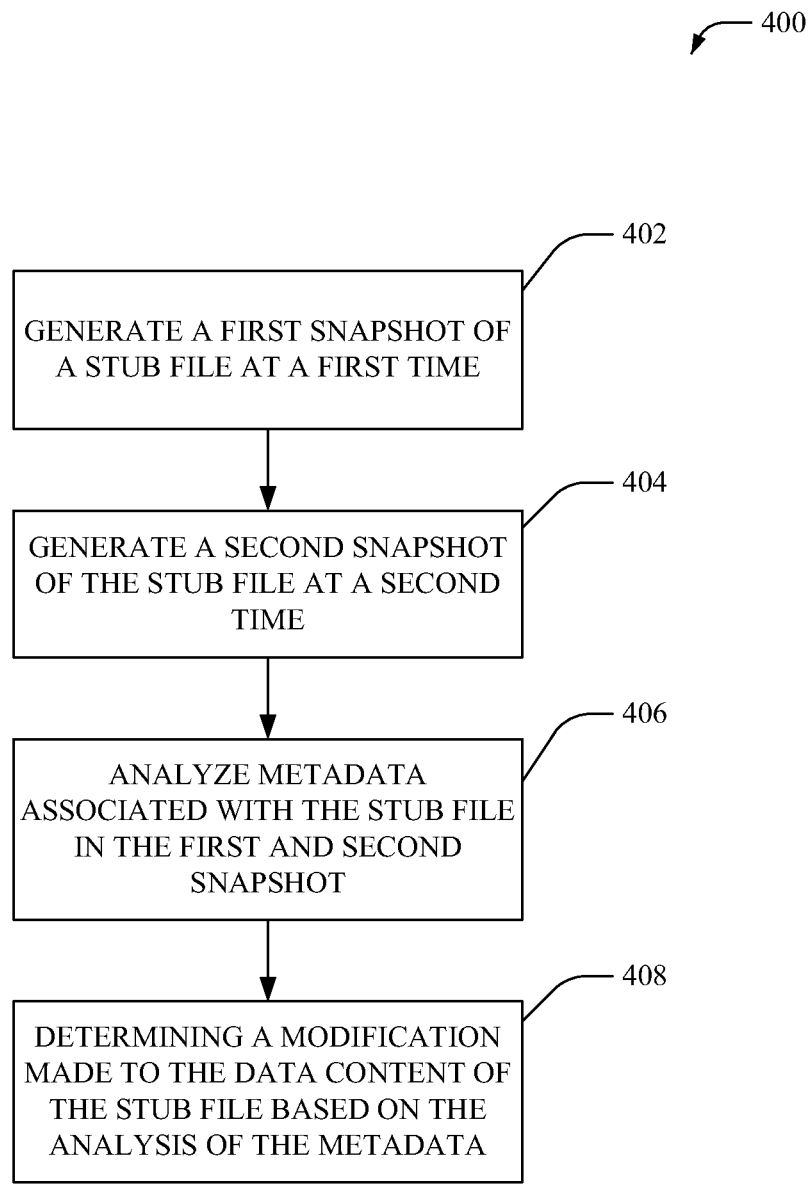
FIG. 4 illustrates an example method for determining modifications made to a stub file over a specified interval of time.

Referring now to FIG. 4, there illustrated is an example method for determining modifications made to a stub file over a specified interval of time, according to an aspect of the subject disclosure. In one example, method 400 can be implemented at least in part by components (e.g., snapshot comparison component 102 and/or snapshot generation component 104) of a source cluster. At 402, a first snapshot of a stub file can be generated at a first time. Further, at 404, a second snapshot of the stub file can be generated at a second time. At 406, metadata associated with the stub file in the first and second snapshots can be analyzed. As an example, the metadata can describe on-disk data (e.g., cached data) and/or on-cloud data (e.g., data stored within the cloud storage). At 408, a modification made to the stub file can be determined based on an analysis of the metadata. As an example, regions of the file that have changed (e.g., from offset X-offset Y) can be identified. In one aspect, data within the identified regions can be replicated to a backup cluster during a synchronization. In another aspect, the data within the identified regions can be provided to a client device for further analysis.

Figure 5:
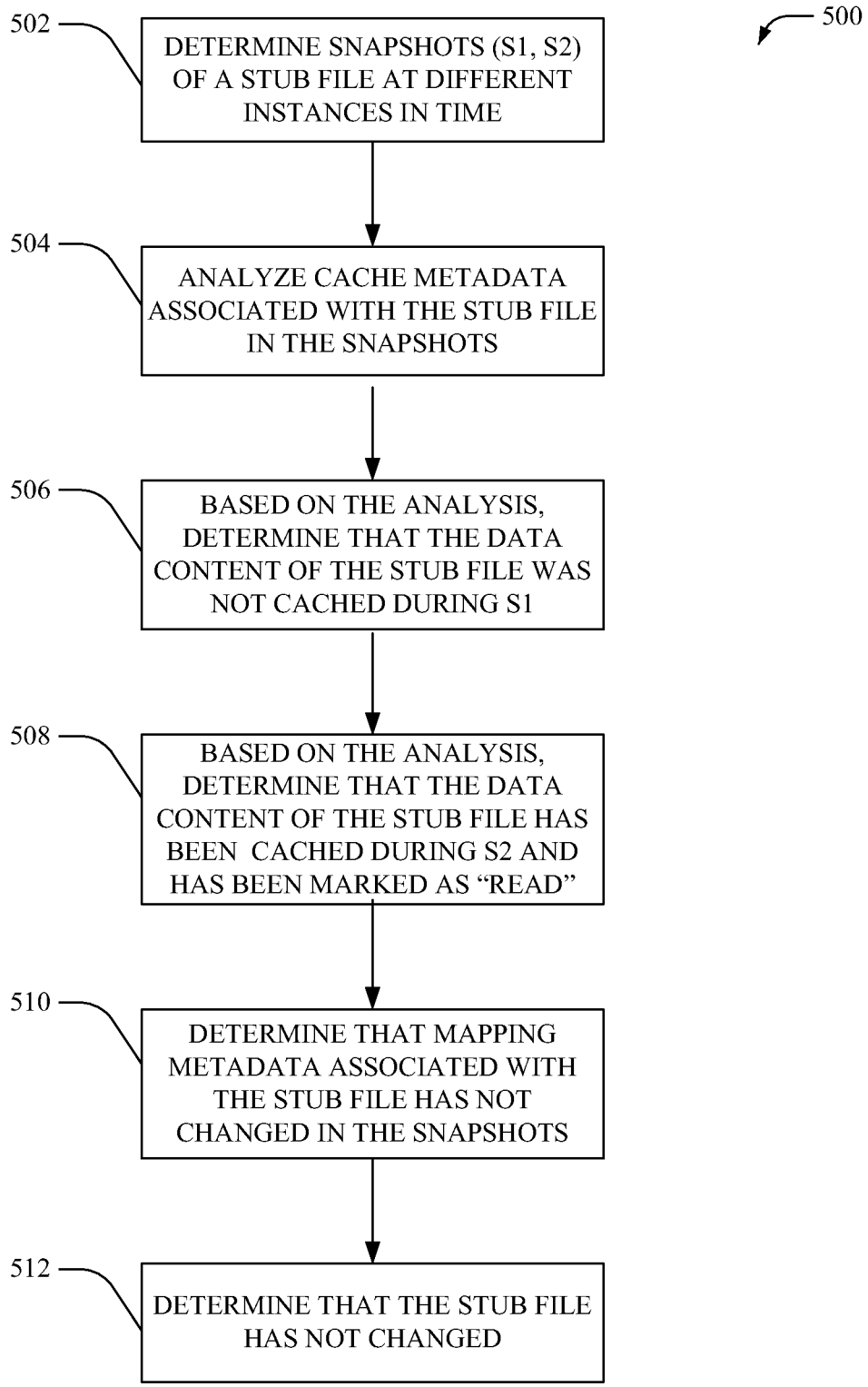
FIG. 5 illustrates an example method that facilitates determining that a stub file has not changed over time.

FIG. 5 illustrates an example method 500 that facilitates determining that a stub file has not changed over time, according to an aspect of the subject disclosure. As an example, method 500 can be implemented by one or more network devices of a distributed file storage system that employs tiered cloud storage. At 502, snapshots (S1, S2) of a stub file can be generated at different instances of time. At 504, cache metadata associated with the stub file in the different snapshots (S1, S2) can be analyzed. As an example, the cache metadata describes the cached data retained within the stub (e.g., operations performed on the cache, such as, read, write, etc.). At 506, it can be determined, based on the analysis, that the data content of stub file was not cached during S1. Further, at 508, it can be determined, based on the analysis, that the data content of stub file has been cached during S2 and has been marked as "read." Furthermore, mapping metadata that describes the content data of the stub file stored within the cloud storage can be analyzed. At 510, it can be determined that the mapping metadata has not changed in the snapshots S1 and S2. Accordingly, at 512, it can be determined that the stub file has not been changed.

Figure 6:
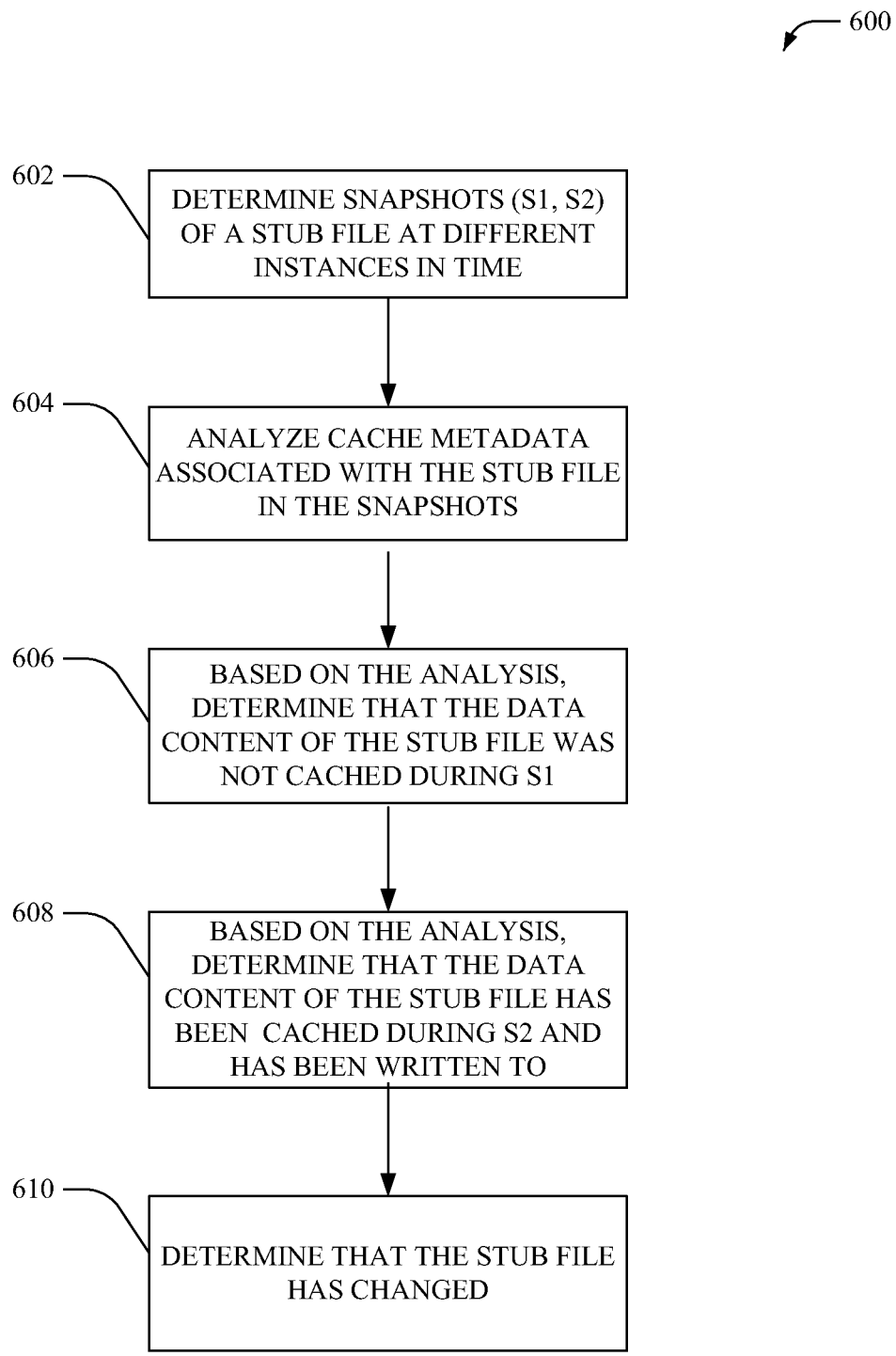
FIG. 6 illustrates an example method that facilitates determining that a stub file has changed over time.

FIG. 6 illustrates an example method 600 that facilitates determining that a stub file has changed over time, according to an aspect of the subject disclosure. As an example, method 600 can be implemented by one or more network devices of a distributed file storage system that employs tiered cloud storage. At 602, snapshots (S1, S2) of a stub file can be generated at different instances of time. At 604, cache metadata associated with the stub file in the different snapshots (S1, S2) can be analyzed. As an example, the cache metadata describes the cached data retained within the stub (e.g., operations performed on the cache, such as, read, write, etc.). At 606, it can be determined, based on the analysis, that the data content of stub file was not cached during S1. Further, at 608, it can be determined, based on the analysis, that the data content of stub file has been cached during S2 and has been written to. Furthermore, mapping metadata that describes the content data of the stub file stored within the cloud storage can be analyzed. Accordingly, at 610, it can be determined that the stub file has been changed.

Figure 7:
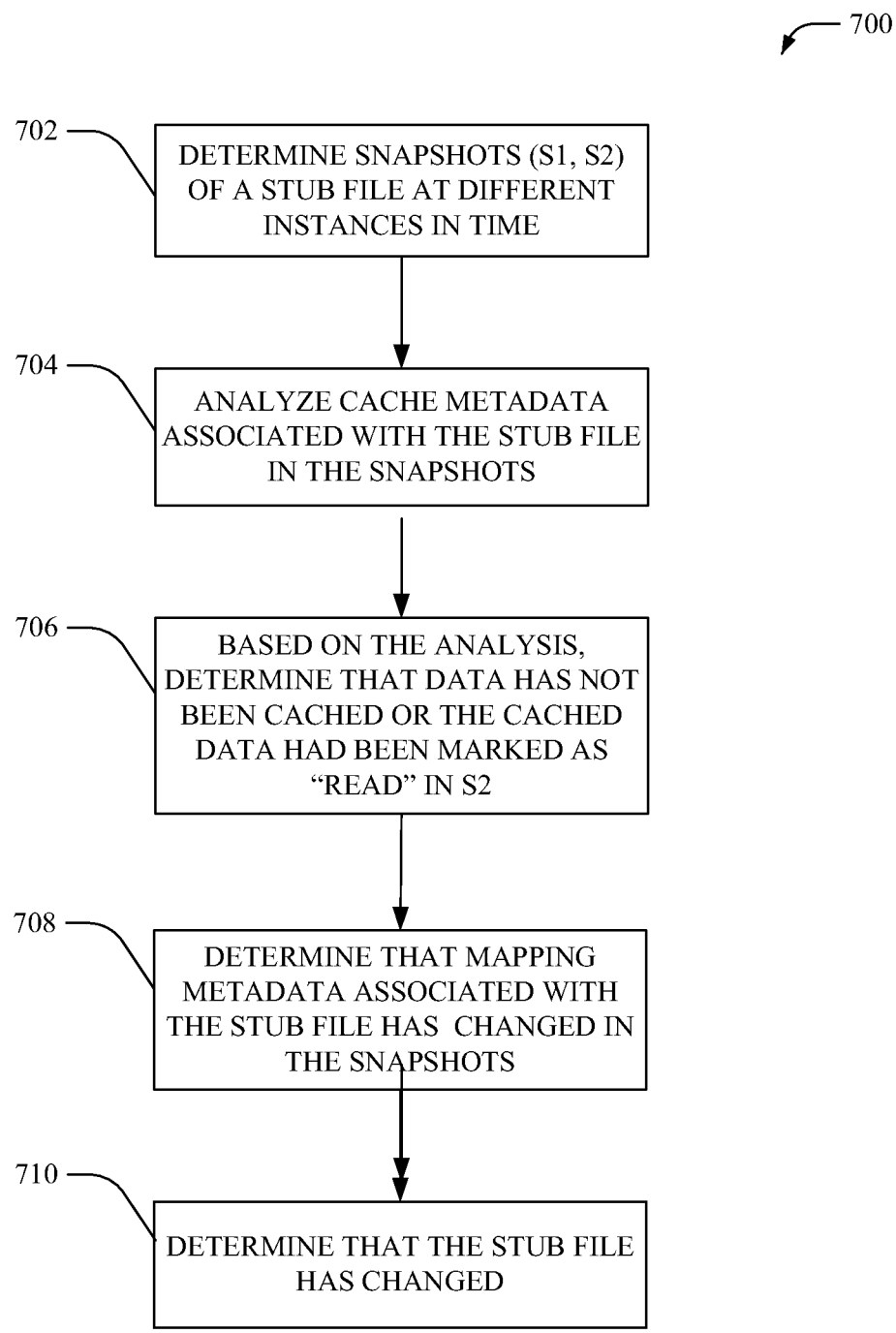
FIG. 7 illustrates another example method that facilitates determining that a stub file has changed over time

FIG. 7 illustrates another example method 700 that facilitates determining that a stub file has changed over time, according to an aspect of the subject disclosure. As an example, method 700 can be implemented by one or more network devices of a distributed file storage system that employs tiered cloud storage. At 702, snapshots (S1, S2) of a stub file can be generated at different instances of time. At 704, cache metadata associated with the stub file in the different snapshots (S1, S2) can be analyzed. As an example, the cache metadata describes the cached data retained within the stub (e.g., operations performed on the cache, such as, read, write, etc.). At 706, it can be determined, based on the analysis, that the data content of stub file was not cached during S2 or that the data content of stub file was cached but only read during S2. Further, mapping metadata that describes the content data of the stub file stored within the cloud storage can be analyzed. At 708, it can be determined that the mapping metadata has changed in the snapshots S1 and S2. Accordingly, at 710, it can be determined that the stub file has been changed.

Figure 8:
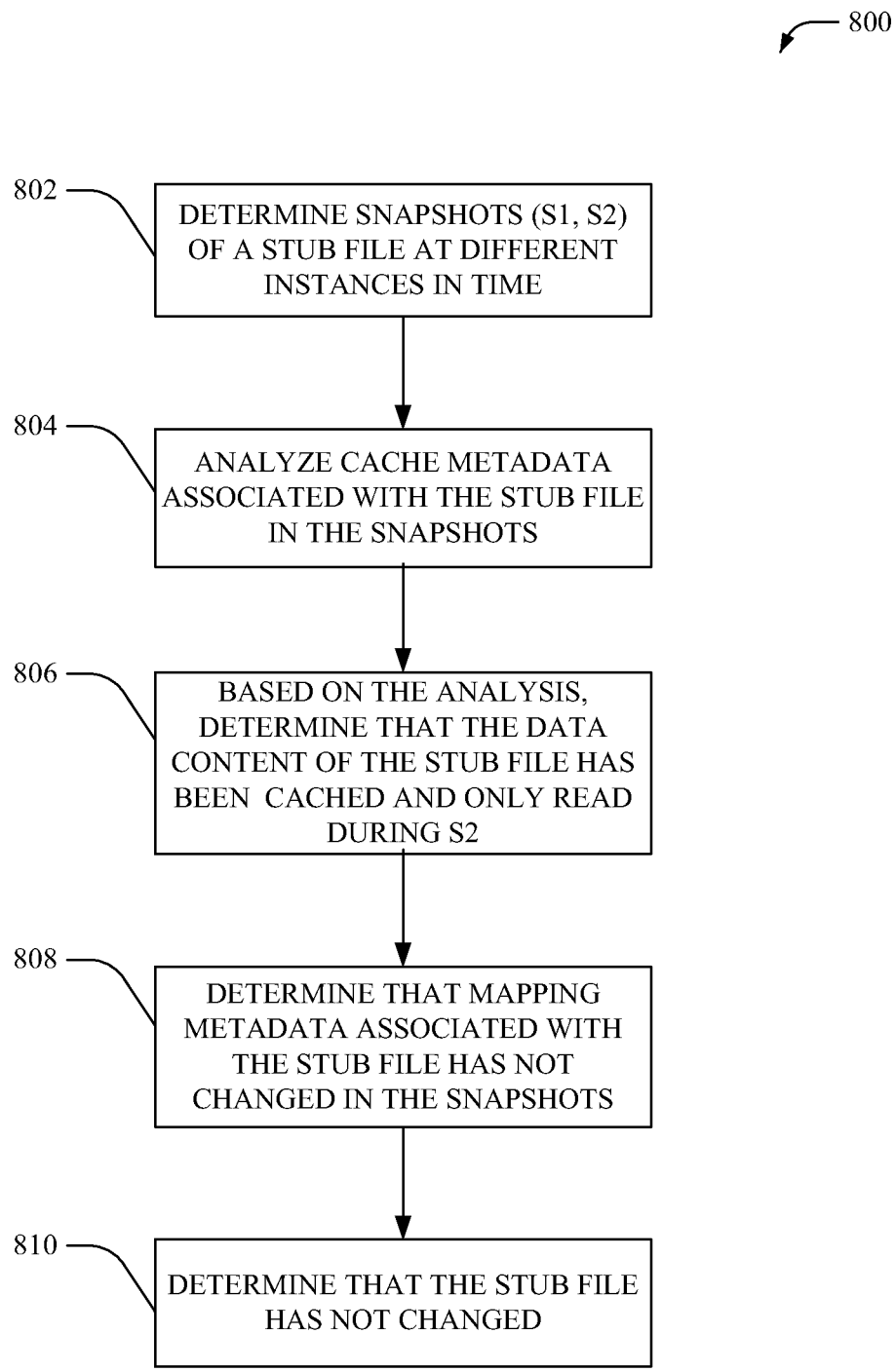
FIG. 8 illustrates another example method that facilitates determining that a stub file has not changed over time

FIG. 8 illustrates another example method 800 that facilitates determining that a stub file has not changed over time, according to an aspect of the subject disclosure. As an example, method 800 can be implemented by one or more network devices of a distributed file storage system that employs tiered cloud storage. At 802, snapshots (S1, S2) of a stub file can be generated at different instances of time. At 804, cache metadata associated with the stub file in the different snapshots (S1, S2) can be analyzed. As an example, the cache metadata describes the cached data retained within the stub (e.g., operations performed on the cache, such as, read, write, etc.). At 806, it can be determined, based on the analysis, that the data content of stub file has been cached and only read during S2. Further, mapping metadata that describes the content data of the stub file stored within the cloud storage can be analyzed. At 808, it can be determined that the mapping metadata has not changed in the snapshots S1 and S2. Accordingly, at 810, it can be determined that the stub file has not been changed.

Figure 9:
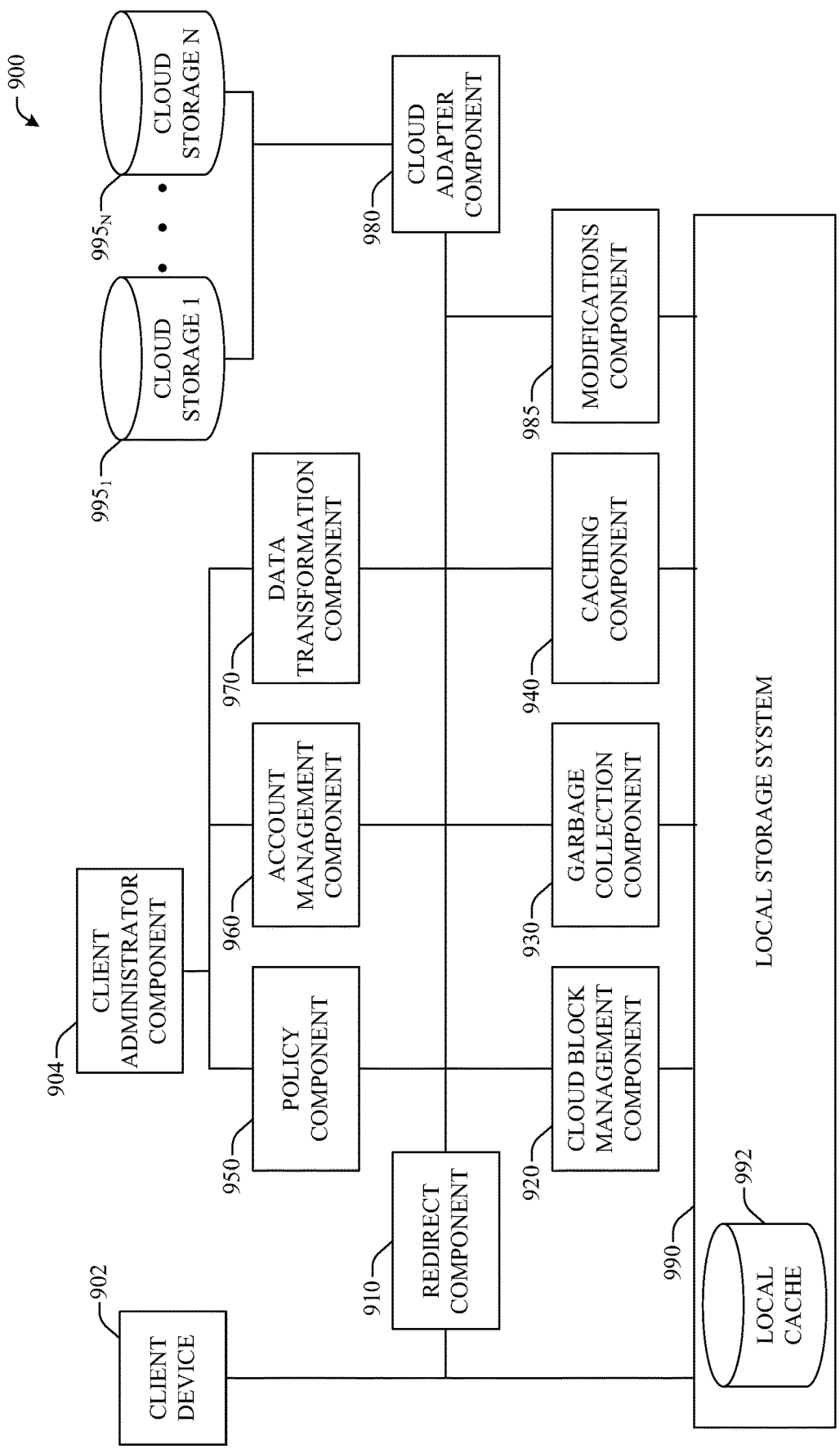
FIG. 9 illustrates a block diagram of an example distributed file storage system that employs tiered cloud storage.

To provide further context for various aspects of the subject specification, FIGS. 9 and 8 illustrate, respectively, a block diagram of an example distributed file storage system 900 that employs tiered cloud storage and block diagram of a computer 1000 operable to execute the disclosed storage architecture in accordance with aspects described herein.

Referring now to FIG. 9, there is illustrated an example local storage system including cloud tiering components and a cloud storage location in accordance with implementations of this disclosure. Client device 902 can access local storage system 990. Local storage system 990 can be a node and cluster storage system such as an EMC Isilon Cluster that operates under OneFS operating system. Local storage system 990 can also store the local cache 992 for access by other components. It can be appreciated that the systems and methods described herein can run in tandem with other local storage systems as well. Further, it is noted that the client device 902 can be substantially similar to the client device 304 and can include functionality as more fully described herein, for example, as described above with regard to the client device 304. In addition, local storage 108 (and/or 108a, 108b) can be implemented at least as part of local storage system 990.

As more fully described below with respect to redirect component 910, the redirect component 910 can intercept operations directed to stub files. Cloud block management component 920, garbage collection component 930, and caching component 940 may also be in communication with local storage system 990 directly as depicted in FIG. 9 or through redirect component 910. A client administrator component 904 may use an interface to access the policy component 950 and the account management component 960 for operations as more fully described below with respect to these components. Data transformation component 970 can operate to provide encryption and compression to files tiered to cloud storage. Cloud adapter component 980 can be in communication with cloud storage 1 and cloud storage N, where N is a positive integer. It can be appreciated that multiple cloud storage locations can be used for storage including multiple accounts within a single cloud storage location as more fully described in implementations of this disclosure. Further, a modifications component 985 can be utilized to determine changes made to the files stored within the local storage system 990.

Cloud block management component 920 manages the mapping between stub files and cloud objects, the allocation of cloud objects for stubbing, and locating cloud objects for recall and/or reads and writes. It can be appreciated that as file content data is moved to cloud storage, metadata relating to the file, for example, the complete inode and extended attributes of the file, still are stored locally, as a stub. In one implementation, metadata relating to the file can also be stored in cloud storage for use, for example, in a disaster recovery scenario.

Mapping between a stub file and a set of cloud objects models the link between a local file (e.g., a file location, offset, range, etc.) and a set of cloud objects where individual cloud objects can be defined by at least an account, a container, and an object identifier. The mapping information (e.g., mapinfo) can be stored as an extended attribute directly in the file. It can be appreciated that in some operating system environments, the extended attribute field can have size limitations. For example, in one implementation, the extended attribute for a file is 8 kilobytes. In one implementation, when the mapping information grows larger than the extended attribute field provides, overflow mapping information can be stored in a separate system b-tree. For example, when a stub file is modified in different parts of the file, and the changes are written back in different times, the mapping associated with the file may grow. It can be appreciated that having to reference a set of non-sequential cloud objects that have individual mapping information rather than referencing a set of sequential cloud objects, can increase the size of the mapping information stored. In one implementation, the use of the overflow system b-tree can limit the use of the overflow to large stub files that are modified in different regions of the file.

File content can be mapped by the cloud block management component 920 in chunks of data. A uniform chunk size can be selected where all files that tiered to cloud storage can be broken down into chunks and stored as individual cloud objects per chunk. It can be appreciated that a large chunk size can reduce the amount of objects needed to represent a file in cloud storage; however, a large chunk size can decrease the performance of random writes.

The account management component 960 manages the information for cloud storage accounts. Account information can be populated manually via a user interface provided to a user or administer of the system. Each account can be associated with account details such as an account name, a cloud storage provider, a uniform resource locator ("URL"), an access key, a creation date, statistics associated with usage of the account, an account capacity, and an amount of available capacity. Statistics associated with usage of the account can be updated by the cloud block management component 920 based on list of mappings it manages. For example, each stub can be associated with an account, and the cloud block management component 920 can aggregate information from a set of stubs associated with the same account. Other example statistics that can be maintained include the number of recalls, the number of writes, the number of modifications, the largest recall by read and write operations, etc. In one implementation, multiple accounts can exist for a single cloud service provider, each with unique account names and access codes.

The cloud adapter component 980 manages the sending and receiving of data to and from the cloud service providers. The cloud adapter component 980 can utilize a set of API. For example, each cloud service provider may have provider specific API to interact with the provider.

A policy component 950 enables a set of policies that aid a user of the system to identify files eligible for being tiered to cloud storage. A policy can use criteria such as file name, file path, file size, file attributes including user generated file attributes, last modified time, last access time, last status change, and file ownership. It can be appreciated that other file attributes not given as examples can be used to establish tiering policies, including custom attributes specifically designed for such purpose. In one implementation, a policy can be established based on a file being greater than a file size threshold and the last access time being greater than a time threshold.

In one implementation, a policy can specify the following criteria: stubbing criteria, cloud account priorities, encryption options, compression options, caching and IO access pattern recognition, and retention settings. For example, user selected retention policies can be honored by garbage collection component 930. In another example, caching policies such as those that direct the amount of data cached for a stub (e.g., full vs. partial cache), a cache expiration period (e.g., a time period where after expiration, data in the cache is no longer valid), a write back settle time (e.g., a time period of delay for further operations on a cache region to guarantee any previous writebacks to cloud storage have settled prior to modifying data in the local cache), a delayed invalidation period (e.g., a time period specifying a delay until a cached region is invalidated thus retaining data for backup or emergency retention), a garbage collection retention period, backup retention periods including short term and long term retention periods, etc.

A garbage collection component 930 can be used to determine which files/objects/data constructs remaining in both local storage and cloud storage can be deleted. In one implementation, the resources to be managed for garbage collection include CMOs, CDOs (e.g., a cloud object containing the actual tiered content data), local cache data, and cache state information.

A caching component 940 can be used to facilitate efficient caching of data to help reduce the bandwidth cost of repeated reads and writes to the same portion (e.g., chunk or sub-chunk) of a stubbed file, can increase the performance of the write operation, and can increase performance of read operations to portion of a stubbed file accessed repeatedly. As stated above with regards to the cloud block management component 920, files that are tiered are split into chunks and in some implementations, sub chunks. Thus, a stub file or a secondary data structure can be maintained to store states of each chunk or sub-chunk of a stubbed file. States (e.g., stored in the stub as cacheinfo) can include a cached data state meaning that an exact copy of the data in cloud storage is stored in local cache storage, a non-cached state meaning that the data for a chunk or over a range of chunks and/or sub chunks is not cached and therefore the data has to be obtained from the cloud storage provider, a modified state or dirty state meaning that the data in the range has been modified, but the modified data has not yet been synched to cloud storage, a sync-in-progress state that indicates that the dirty data within the cache is in the process of being synced back to the cloud and a truncated state meaning that the data in the range has been explicitly truncated by a user. In one implementation, a fully cached state can be flagged in the stub associated with the file signifying that all data associated with the stub is present in local storage. This flag can occur outside the cache tracking tree in the stub file (e.g., stored in the stub file as cacheinfo), and can allow, in one example, reads to be directly served locally without looking to the cache tracking tree.

The caching component 940 can be used to perform at least the following seven operations: cache initialization, cache destruction, removing cached data, adding existing file information to the cache, adding new file information to the cache, reading information from the cache, updating existing file information to the cache, and truncating the cache due to a file operation. It can be appreciated that besides the initialization and destruction of the cache, the remaining five operations can be represented by four basic file system operations: Fill, Write, Clear and Sync. For example, removing cached data is represented by clear, adding existing file information to the cache by fill, adding new information to the cache by write, reading information from the cache by read following a fill, updating existing file information to the cache by fill followed by a write, and truncating cache due to file operation by sync and then a partial clear.

In one implementation, the caching component 940 can track any operations performed on the cache. For example, any operation touching the cache can be added to a queue prior to the corresponding operation being performed on the cache. For example, before a fill operation, an entry is placed on an invalidate queue as the file and/or regions of the file will be transitioning from an uncached state to cached state. In another example, before a write operation, an entry is placed on a synchronization list as the file and/or regions of the file will be transitioning from cached to cached-dirty. A flag can be associated with the file and/or regions of the file to show that it has been placed in a queue and the flag can be cleared upon successfully completing the queue process.

In one implementation, a time stamp can be utilized for an operation along with a custom settle time depending on the operations. The settle time can instruct the system how long to wait before allowing a second operation on a file and/or file region. For example, if the file is written to cache and a write back entry is also received, by using settle times, the write back can be requeued rather than processed if the operation is attempted to be performed prior to the expiration of the settle time.

In one implementation, a cache tracking file can be generated and associated with a stub file at the time it is tiered to the cloud. The cache tracking file can track locks on the entire file and/or regions of the file and the cache state of regions of the file. In one implementation, the cache tracking file is stored in an Alternate Data Stream ("ADS"). It can be appreciated that ADS are based on the New Technology File System ("NTFS") ADS. In one implementation, the cache tracking tree tracks file regions of the stub file, cached states associated with regions of the stub file, a set of cache flags, a version, a file size, a region size, a data offset, a last region, and a range map.

In one implementation, a cache fill operation can be processed by the following steps: (1) an exclusive lock on can be activated on the cache tracking tree; (2) it can be verified whether the regions to be filled are dirty; (3) the exclusive lock on the cache tracking tree can be downgraded to a shared lock; (4) a shared lock can be activated for the cache region; (5) data can be read from the cloud into the cache region; (6) update the cache state for the cache region to cached; and (7) locks can be released.

In one implementation, a cache read operation can be processed by the following steps: (1) a shared lock on the cache tracking tree can be activated; (2) a shared lock on the cache region for the read can be activated; (3) the cache tacking tree can be used to verify that the cache state for the cache region is not "not cached;" (4) data can be read from the cache region; (5) the shared lock on the cache region can be deactivated; (6) the shared lock on the cache tracking tree can be deactivated.

In one implementation, a cache write operation can be processed by the following steps: (1) an exclusive lock on can be activated on the cache tracking tree; (2) the file can be added to the synch queue; (3) if the file size of the write is greater than the current file size, the cache range for the file can be extended; (4) the exclusive lock on the cache tracking tree can be downgraded to a shared lock; (5) an exclusive lock can be activated on the cache region; (6) if the cache tracking tree marks the cache region as "not cached" the region can be filled; (7) the cache tracking tree can updated to mark the cache region as dirty; (8) the data can be written to the cache region; (9) the lock can be deactivated.

In one implementation, data can be cached at the time of a first read. For example, if the state associated with the data range called for in a read operation is non-cached, then this would be deemed a first read, and the data can be retrieved from the cloud storage provider and stored into local cache. In one implementation, a policy can be established for populating the cache with range of data based on how frequently the data range is read; thus, increasing the likelihood that a read request will be associated with a data range in a cached data state. It can be appreciated that limits on the size of the cache, and the amount of data in the cache can be limiting factors in the amount of data populated in the cache via policy.

A data transformation component 970 can encrypt and/or compress data that is tiered to cloud storage. In relation to encryption, it can be appreciated that when data is stored in off-premises cloud storage and/or public cloud storage, users can require data encryption to ensure data is not disclosed to an illegitimate third party. In one implementation, data can be encrypted locally before storing/writing the data to cloud storage.

In one implementation, the modifications component 985 can determine whether a stub file within the local storage system 990 has changed over a defined time period. As an example, the modifications component 985 can include the snapshot comparison component 102 and/or snapshot generation component 104.

Figure 10:
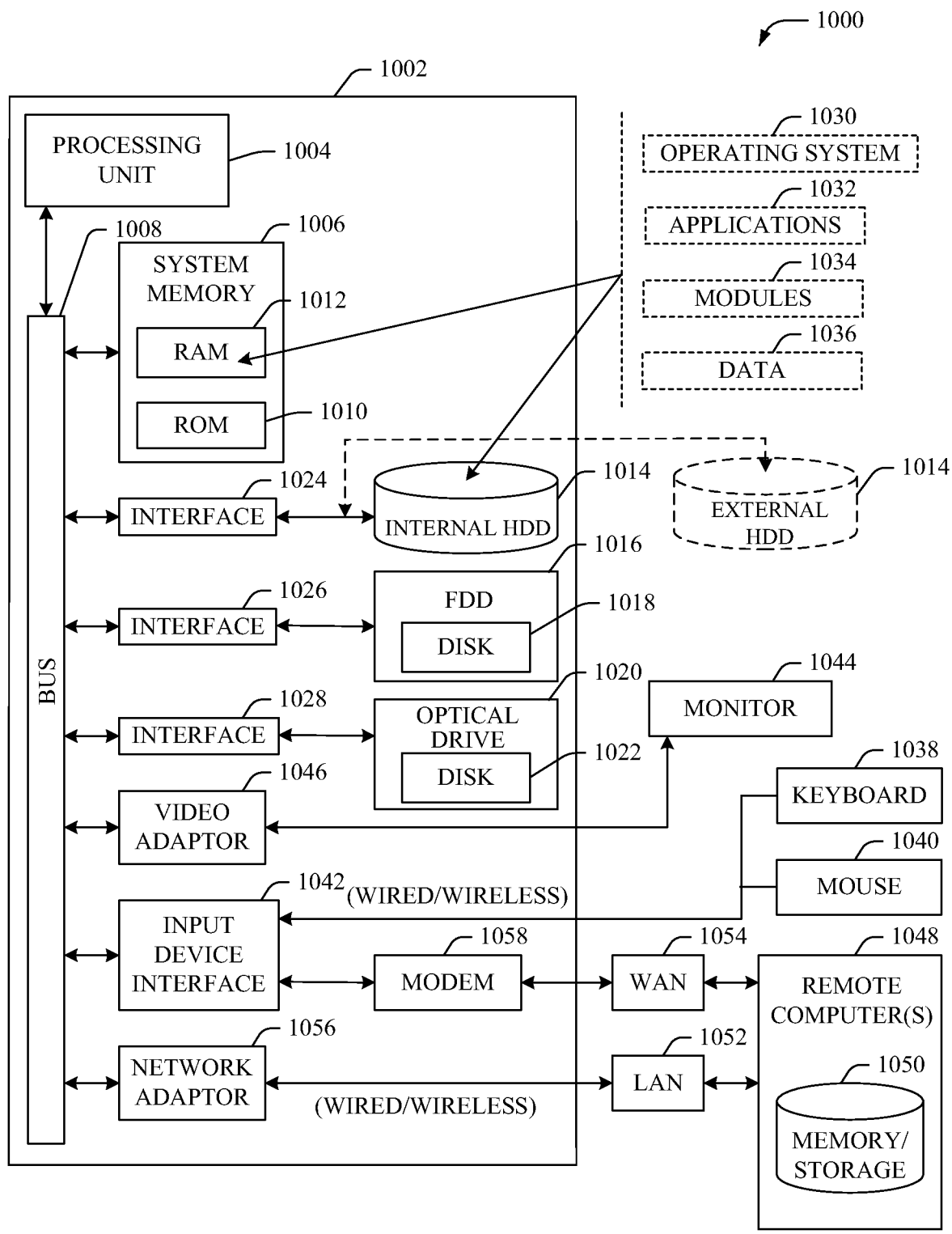
FIG. 10 illustrates a block diagram of an example computer operable to execute the disclosed communication architecture.

Referring now to FIG. 10, there is illustrated a block diagram of a computer 1002 operable to execute the disclosed communication architecture. In order to provide additional context for various aspects of the disclosed subject matter, FIG. 10 and the following discussion are intended to provide a brief, general description of a suitable computing environment 1000 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices. The illustrated aspects of the specification can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media.

With reference again to FIG. 10, the example environment 1000 for implementing various aspects of the specification includes a computer 1002, the computer 1002 including a processing unit 1004, a system memory 1006 and a system bus 1008. As an example, the component(s), server(s), node(s), cluster(s), system(s), and/or device(s) (e.g., snapshot comparison component 102, snapshot generation component 104, local storage 108, source cluster 202a, target cluster(s) 202b, synchronization component 204a, synchronization component 204b, snapshot comparison component 102a, snapshot generation component 104a, snapshot comparison component 102b, snapshot generation component 104b, local storage 108a, local storage 108b, source cluster 302, client device 304, request reception component 306, results component 308, client device 902, client administrator component 904, cloud block management component 920, garbage collection component 930, caching component 940, policy component 950, account management component 960, data transformation component 970, cloud adapter component 980, modifications component 985, local storage system 990, etc.) disclosed herein with respect to systems 100-300 and 900 can each include at least a portion of the computer 1002. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014, which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject disclosure.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods of the specification.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the specification can be implemented with various commercially available operating systems or combinations of operating systems.

A user can enter commands and information into the computer 1002 through one or more wired/wireless input devices, e.g., a keyboard 1038 and/or a pointing device, such as a mouse 1040 or a touchscreen or touchpad (not illustrated). These and other input devices are often connected to the processing unit 1004 through an input device interface 1042 that is coupled to the system bus 1008, but can be connected by other interfaces, such as a parallel port, an IEEE 1394 serial port, a game port, a USB port, an infrared (IR) interface, etc. A monitor 1044 or other type of display device is also connected to the system bus 1008 via an interface, such as a video adapter 1046.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are example and other means of establishing a communications link between the computers can be used.

The computer 1002 is operable to communicate with any wireless devices or entities operatively disposed in wireless communication, e.g., desktop and/or portable computer, server, communications satellite, etc. This includes at least WiFi and Bluetooth® wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out; anywhere within the range of a base station. WiFi networks use radio technologies called IEEE 802.11 (a, b, g, n, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 5 GHz radio band at an 54 Mbps (802.11a) data rate, and/or a 2.4 GHz radio band at an 11 Mbps (802.11b), an 54 Mbps (802.11g) data rate, or up to an 600 Mbps (802.11n) data rate for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/ output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
      determining first snapshot data comprising a first snapshot of a stub file at a first instance in time, wherein the first snapshot data comprises first metadata associated with the stub file that comprises a first data structure that references content stored in a network storage device, and comprises a second data structure associated with a first portion of the content that has been cached within the stub file, wherein the second data structure indicates that a first portion of the content stored in the network storage device has been read or modified;
      determining second snapshot data indicative of a second snapshot of the stub file at a second instance in time, wherein the second snapshot data comprises second metadata associated with the stub file that indicates that a second portion of the content has been read or modified; and
      in response to determining that the first metadata and the second metadata satisfies a defined criterion, determining that the content has been changed between the first instance in time and the second instance in time.

2. The system of claim 1, wherein the second metadata comprises a third data structure that references the content and comprises a fourth data structure associated with a second portion of the content that has been cached within the stub file.

3. The system of claim 2, wherein the determining the first snapshot data is performed in response to receiving a first request for the first portion of the content, and wherein the determining the second snapshot data is performed in response to receiving a second request for the second portion of the content.

4. The system of claim 2, wherein the second data structure indicates that the first portion of the content has been read or modified, and wherein the fourth data structure indicates that the first portion of the content has been read or modified.

5. The system of claim 2, wherein the operations further comprise:
   in response to determining that the fourth data structure indicates that the second portion of the content has been read and that the first data structure matches the third data structure, determining that the content has not been changed between the first instance and the second instance in time.

6. The system of claim 2, wherein the determining that the first metadata and the second metadata satisfies the defined criterion comprises determining that the fourth data structure indicates that the second portion of the content has been written to and that the first data structure matches the third data structure.

7. The system of claim 2, wherein the operations further comprise:
   in response to determining that the fourth data structure indicates that the second portion of the content has been written to and that the first data structure does not match the third data structure, determining that the content has not been changed between the first instance and the second instance in time.

8. The system of claim 2, wherein the determining that the first metadata and the second metadata satisfies the defined criterion comprises determining that the fourth data structure indicates that the second portion of the content has been read and that the first data structure does not match the third data structure.

9. The system of claim 1, wherein the first metadata further comprises sparseness information describing a sparse region of the network storage device, and wherein the sparse region is a portion of the network storage device that does not store the content.

10. The system of claim 1, wherein the stub file is stored on a source cluster device and wherein the determining that the content has been changed comprises determining that the content has been changed in response to determining that the stub file is to be synchronized with a replica of the stub file that is stored on a target cluster device.

11. The system of claim 1, wherein at a third instance in time the stub file is converted to a local file, and wherein the local file comprises the content and is retained within a source cluster device.

12. A method, comprising:
   determining, by a system comprising a processor, first snapshot data comprising a first snapshot of a stub file at a first instance in time, wherein the first snapshot data comprises first metadata associated with the stub file that comprises a first mapping data structure that references content stored in a network storage device, and comprises a first cache data structure associated with a first portion of the content that has been cached within the stub file, wherein the first data structure indicates that a first portion of the content stored in the network storage device has been read or modified;
   determining, by the system, second snapshot data indicative of a second snapshot of the stub file at a second instance in time, wherein the second snapshot data comprises second metadata associated with the stub file that indicates that a second portion of the content has been read or modified; and
   in response to determining that the first metadata and the second metadata satisfies a defined criterion, determining, by the system, that the content has been changed between the first instance in time and the second instance in time.

13. The method of claim 12, further comprising:
   in response to determining that a second cache data structure of the second metadata indicates that the content has been modified and that the first mapping data structure and a second mapping data structure of the second metadata do not match, determining, by the system, that the content has not been altered between the first instance in time and the second instance in time.

14. The method of claim 12, further comprising:
   in response to determining that the first cache data structure of the first metadata indicates that the content has been modified and that the first mapping data structure of the first metadata and a second mapping data structure of the second metadata match, determining, by the system, that the content has been altered between the first instance in time and the second instance in time.

15. The method of claim 12, wherein the determining that the first metadata and the second metadata satisfies a defined criterion comprises:
   in response to determining that the first cache data structure indicates that the portion of the content has been read and that the first mapping data structure and a second mapping data structure of the second metadata match, determining, by the system, that the content has not been altered between the different instances in time.

16. The method of claim 12, further comprising:
   receiving, by the system, query data indicative of a query for determining a difference in the first snapshot and the second snapshot.

17. The method of claim 15, wherein the stub file is retained within a source cluster device and the method further comprises:
   in response to determining a difference between the first snapshot and the second snapshot, synchronizing, by the system, the stub file with a replica of the stub file that is retained within a target cluster device.

18. A non-transitory computer-readable storage medium comprising instructions that, in response to execution, cause a device comprising a processor to perform operations, comprising:
   determining first snapshot data comprising a first snapshot of a stub file at a first instance in time, wherein the first snapshot data comprises first metadata associated with the stub file that comprises a first mapping data structure that references content stored in a network storage device, and comprises a first cache data structure associated with a first portion of the content that has been cached within the stub file, wherein the first cache data structure indicates that a first portion of the content stored in the network storage device has been read or modified;
   determining second snapshot data indicative of a second snapshot of the stub file at a second instance in time, wherein the second snapshot data comprises second metadata associated with the stub file that indicates that a second portion of the content has been read or modified; and
   in response to determining that the first metadata and the second metadata satisfies a defined criterion, determining that the content has been changed between the first instance in time and the second instance in time.

19. The non-transitory computer-readable storage medium of claim 18, wherein the operations further comprise:
   in response to determining that a second cache data structure of the second metadata indicates that the content has been modified and that the first mapping data structure and a second mapping data structure of the second metadata do not match, verifying that the content has not been altered between the first instance in time and the second instance in time.

20. The non-transitory computer-readable storage medium of claim 18, wherein operations further comprise:
   in response to determining that the first cache data structure indicates that the content has been modified and that the first mapping data structure and a second mapping data structure of the second metadata match, verifying that the content has been altered between the first instance in time and the second instance in time.

\* \* \* \* \*